United States Patent [19]

Scott et al.

[11] 4,406,352
[45] Sep. 27, 1983

[54] DISC BRAKE ACTUATOR

[75] Inventors: James P. Scott, Fort Wayne, Ind.; Charles H. Lantz, Rochester; David D. Sheill, Farmington Hills, both of Mich.

[73] Assignee: Rockwell International Corporation, Pittsburgh, Pa.

[21] Appl. No.: 212,000

[22] Filed: Dec. 1, 1980

[51] Int. Cl.³ .......................................... F16D 55/224
[52] U.S. Cl. ................... 188/72.8; 74/89.15; 192/94
[58] Field of Search ............... 188/71.9, 72.7, 72.8; 192/94; 74/89.15, 424.8 R, 424.8 UA

[56] References Cited

U.S. PATENT DOCUMENTS

| | | | |
|---|---|---|---|
| 2,818,744 | 1/1958 | Moody | 74/424.8 R |
| 3,024,873 | 3/1962 | Wilkinson | 188/72.8 X |
| 3,321,049 | 5/1967 | Swift | 188/71.9 |
| 3,770,082 | 11/1973 | Brooks et al. | 188/71.9 |
| 3,856,042 | 12/1974 | Fletcher et al. | 74/424.8 UA X |
| 3,893,545 | 7/1975 | Burnett | 188/72.7 X |
| 3,976,168 | 8/1976 | Yamamoto | 188/71.9 |
| 4,022,300 | 5/1977 | Afanador et al. | 188/72.8 X |
| 4,036,330 | 7/1977 | Henning et al. | 188/72.8 |
| 4,180,146 | 12/1979 | Airheart | 188/71.8 |

FOREIGN PATENT DOCUMENTS

| | | | |
|---|---|---|---|
| 1425367 | 9/1969 | Fed. Rep. of Germany | 188/72.8 |
| 2558581 | 7/1977 | Fed. Rep. of Germany | 188/72.8 |
| 1406987 | 6/1965 | France | 188/72.8 |

Primary Examiner—George E. A. Halvosa

[57] ABSTRACT

A fluid motor moves a lever to turn a power screw mounted for rotation by a pair of axially spaced bushings. External threads on the power screw engage internal threads on an actuator and slide or translate the actuator and a piston in a brake-applying direction. A spring moves the piston in the opposite direction to a rest position. A cap fits over a medial flange of the power screw and has a spline connection with the actuator to prevent rotation of the actuator. Four bolts connect the fluid motor mounting bracket and the cap to a caliper which slides on parallel pins fixed to a torque plate secured to a vehicle axle.

2 Claims, 5 Drawing Figures

DISC BRAKE ACTUATOR

BACKGROUND OF THE INVENTION

1. Field of the Invention

The present invention relates to a disc brake and more specifically to an improved actuator for a disc brake.

The present invention is particularly applicable to a disc brake of the type which includes a rotor or disc mounted for rotation with a vehicle wheel and a floating caliper straddling the periphery of the rotor. The caliper is usually mounted on a support or torque plate by means permitting movement of the caliper in an axial direction relative to the torque plate and rotor. Brake pads are carried by the caliper on opposite sides of the rotor and are movable into contact with oppositely disposed friction braking surfaces of the rotor by means of an actuator assembly which is usually driven by a fluid motor. In a floating caliper disc brake, each friction pad is located intermediate one leg of the caliper and the adjacent friction surface of the rotor. The actuator assembly is carried by one leg of the caliper and serves to move the friction pad adjacent that leg axially into contact with the rotor, the reaction force of the contact serving to draw the other leg of the caliper and the other friction pad into contact with the opposite surface of the rotor.

2. Description of the Prior Art

Disc brakes are well known and widely used on vehicles. There are many different types of actuators for disc brakes. In the automotive and heavy vehicle art actuators comprised of fluid driven pistons, cam mechanisms and power screws are known. Examples of actuators and adjusters for actuators are found in Class 188, subclasses 71 and indented subclasses, and Class 196 in the U.S. Patent and Trademark Office.

SUMMARY OF THE INVENTION

The present invention provides an improved actuator for a vehicle disc brake comprised of a power screw mounted for rotation by a pair of axially spaced bushings. An air motor moves a lever to turn the power screw. External threads on the power screw engage internal threads on an actuator and slide or translate the actuator and a piston in a brake-applying direction. A spring moves the piston in the opposite direction to a rest position. A cap fits over a medial flange of the power screw and has a spline connection with the actuator to prevent rotation of the actuator. Four bolts connect the air motor mounting bracket and the cap to a caliper which slides on parallel pins fixed to a torque plate secured to a vehicle axle.

In the preferred embodiment the power screw shaft has a medial radially extending flange, a first end splined for connection to the torque applying means and a second end with external threads and the actuator is a power screw nut having internal threads engaging the external threads on the power screw shaft. The external surface of the power screw nut is splined and the cap has internal splines contacting the external splines on the nut to prevent rotation of the nut while permitting axial movement of the nut internal of the cap. The piston is hollow, apertured at one end and formed integrally with a radially extending load plate. The medial flange of the power screw shaft is seated adjacent a shoulder internally of the cap to axially fix the power screw shaft with the second end of the shaft extending through the aperture into the hollow interior of the piston. A bushing carried by the cap mounts the splined end of the shaft for rotation and a bushing internal of the piston mounts the second end of the shaft. A spring seated at one end against the bushing internal of the piston and at the other end against the piston moves the piston to a rest position when torque is no longer applied to turn the power screw.

The advantages offered by the present invention will become apparent from the following description of the embodiment shown in the accompanying drawings.

DESCRIPTION OF THE DRAWINGS

In the drawings, wherein like reference numerals refer to like parts.

DESCRIPTION OF THE INVENTION

Figure 1:
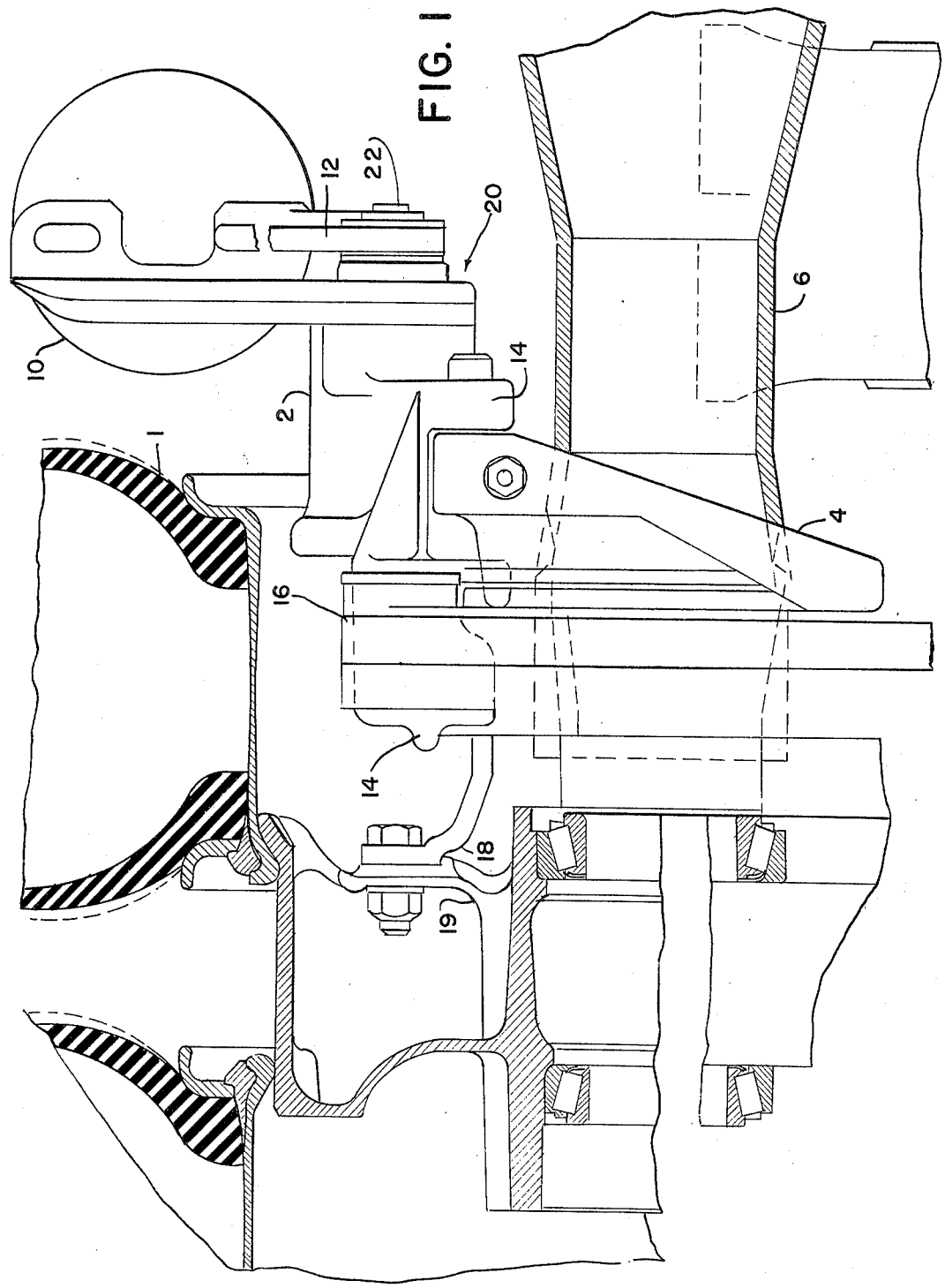
FIG. 1 is a plan view showing the actuator of the present invention mounted on a vehicle axle.

Referring to FIG. 1, a cutaway truck wheel assembly is generally indicated by the numeral 1. A disc brake assembly 2 is mounted on a spider or torque plate 4 fixed to an axle housing 6.

An air motor 10 is connected by a link 12 which serves as a torque lever to a power screw 22 of a disc brake actuator assembly generally designated by the numeral 20. The power screw, as it is turned by the link 12, translates a piston in a brake-applying direction which causes a pair of friction pads supported by a caliper 14 to apply braking force to the axially spaced radially oriented surfaces of a brake disc or rotor 16, which is connected by a flange 18 to the hub 19 of the wheel assembly 1.

Figure 2:
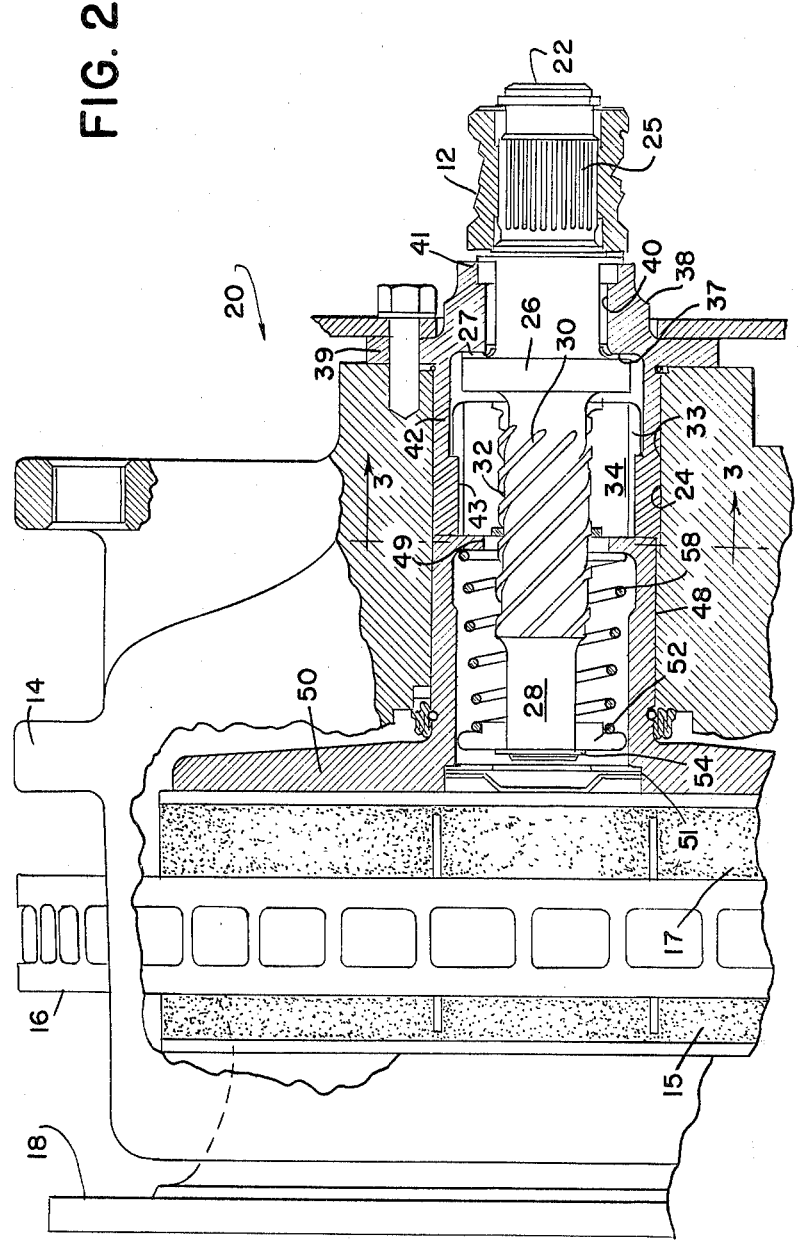
FIG. 2 is a cross-sectional view of a preferred embodiment of the invention.
Figure 3:
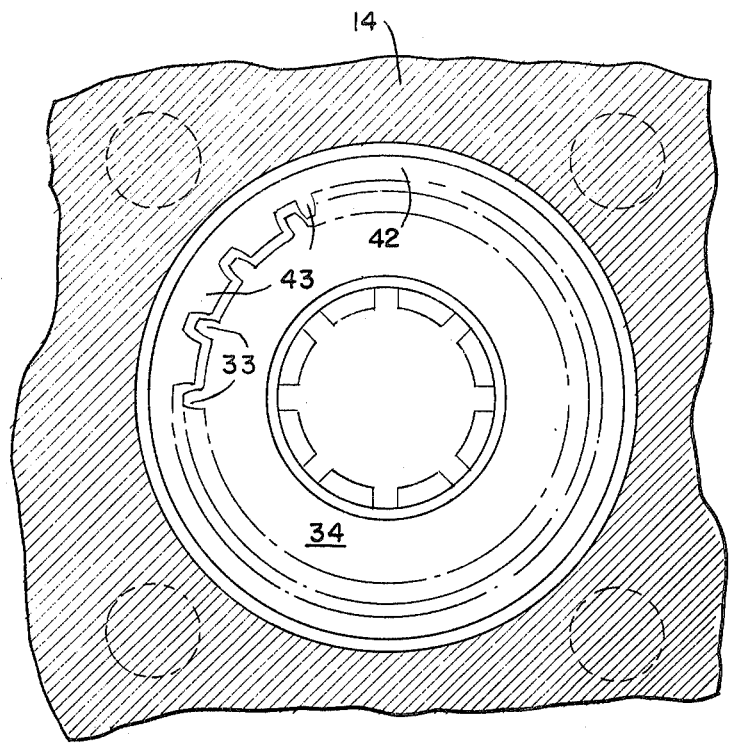
FIG. 3 is a view, partly in section, taken along the line 3—3 of FIG. 2.
Figure 4:
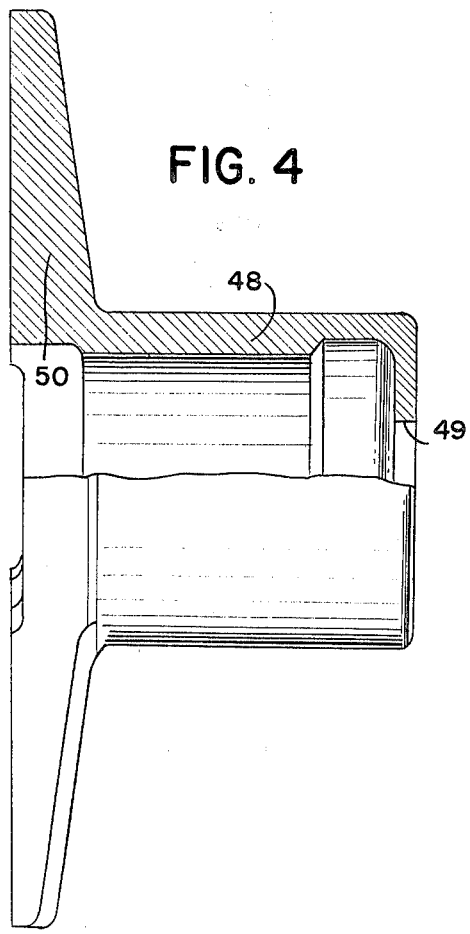
FIG. 4 is a plan view, partly in section, of the piston shown in FIG. 3.

The preferred embodiment of the disc brake actuator assembly 20 is shown in FIG. 2. With reference to FIG. 2, the disc brake actuator assembly 20 is disposed within a stepped cylindrical bore 24 extending axially through a depending leg of the caliper 14 which serves as a housing for the actuator assembly 20. The actuator assembly is comprised of a power screw shaft 22 having a first splined end 25 for receiving a lever which is the link 12 to the air motor 10. A second end 28 of the power screw shaft 22 has external threads 30 which mate with internal threads 32 of a power screw nut or actuator nut 34. A medial radially extending flange 26 is provided between the splined end 25 and the threaded end 28 of power screw shaft and is seated against a thrust washer 27 which in turn abuts a radially extending shoulder or surface 37 provided internally of a power screw shaft cap 38.

The power screw shaft cap 38 has a flange 39 which is secured by four bolts to the caliper 14 and partially closes the bore 24. The cap 38 is provided with an aperture or bore 40 in which a bushing 41 is provided to support the splined end 25 of the power screw shaft for rotation. The cap 28 also includes a hollow cylindrical portion 42 that is seated within and extends axially within the caliper bore 24. The interior surface of the cap portion 42 is provided with a plurality of axially extending splines 43 which engage a plurality of splines 33 provided to the external surface of the actuator nut 34. The connection between the splines 33 and 43 prevent rotation of the actuator nut 34 while permitting the nut to slide or translate axially along the splines 43. In the preferred embodiment twenty two splines are provided circumferentially around the external surface of the actuator nut 34 to evenly distribute the substantial turning forces encountered by the actuator nut during actuation of the disc brake assembly.

The actuator assembly 20 also includes a hollow piston 48 having an aperture 49 at one end and open at the other end where it is formed integrally with a radially extending load plate 50. The open end of the piston is closed by a seal and snap ring assembly 51 to prevent the ingress of dirt and moisture.

The end 28 of the power screw shaft 22 extends through the aperture 49 to the hollow interior of piston 48 where it is supported for rotation by a bushing 52 disposed between the hollow interior of piston 48 and the power screw shaft 22 adjacent the extremity of the power shaft end 28. A snap ring 54 seated in a groove extending circumferentially around the power shaft 22 adjacent the extremity of the end 28 locates the bushing adjacent that end of the power shaft 22 and fixes the bushing 52 against axial movement off of that end of the power shaft.

A return spring 58 is seated at one end against the bushing 52 and at the other end is seated against the internal radially extending surface of the piston 48 surrounding the aperture 49. The return spring 58 serves to bias the apertured wall of the piston axially away from the bushing 52 when the brake assembly is not actuated, i.e. when torque is not being applied to rotate the power screw shaft 22. As the spring moves the piston 48 to a rest position, the piston urges the actuator nut 34 to rotate on the power screw threads 30,32 and translate axially toward the medial radially extending flange 26.

Figure 5:
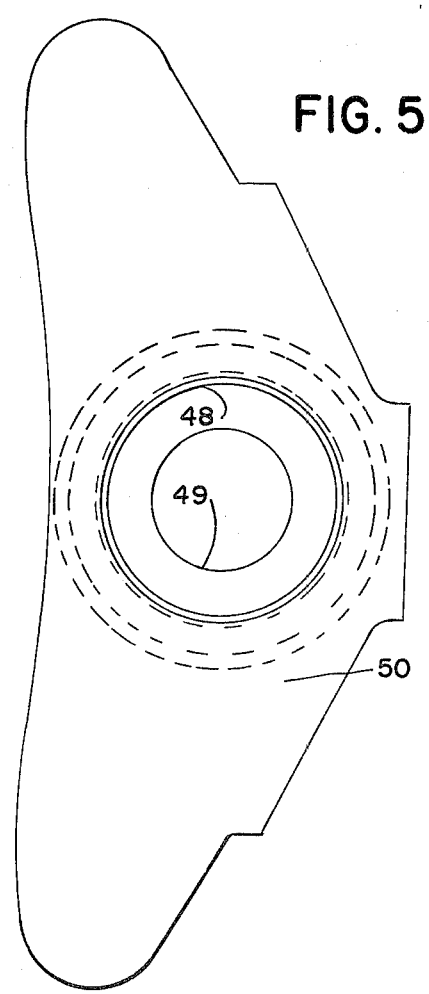
FIG. 5 is an end view of the piston shown in FIG. 4.

When the air motor 10 is pressurized to apply the disc brake, the air motor moves the link 12 in conventional manner to turn the power screw 22 in one direction. As the power screw shaft 22 turns, the power screw threads 30. 32 translate the actuator nut in a brake-applying direction. The actuator nut 34 in abutment with the apertured wall of piston 48 moves the piston 48 and its radially extending load plate 50 axially toward the rotor 16. The load plate 50, as shown by FIG. 5, is contoured to a shape similar to the shape of the backing plate of friction pad 17. The load plate 50 distributes the axial thrust applied to the piston 48 by the actuator nut 34 across the backing plate of friction pad 17 and moves the friction pad 17 into contact with the adjacent surface of rotor 16.

Reaction force encountered when the friction pad 17 contacts the rotor 16 is taken back through the power screw shaft 22, medial flange 26, thrust washer 27, and cap 38 which draws the caliper 14 to the right as shown in FIG. 2 and moves the friction pad 15 into contact with the other surface of rotor 16. In FIG. 2, the components of the disc brake actuator assembly are shown in the brake actuated position with the friction pads 15 and 17 in pressurized contact with the axially spaced surfaces of the rotor 16.

When pressure is released from the air motor 10, torque is no longer applied to the power screw shaft 22 and the spring 58 biases the piston 48 and the load plate 50 axially away from the rotor 16 to a rest position allowing adequate running clearance between the lining material on friction pads 15 and 17 and the adjacent surfaces of the rotor 16. The piston 48 also urges the actuator nut 34 axially towards the medial flange 26 and with the force of a return spring provided internally of the air motor the link 12 is retracted and the caliper 14 is returned to its inactive or rest position as shown by phantom lines in FIG. 1.

The actuator assembly thus provides an effective means for actuating a disc brake which includes, among other features, a spring for returning the piston to its inactive or rest position, a pair of axially spaced bearings mounting the power screw shaft for rotation, and a splined connection between the actuator nut and the cap for distributing the turning forces encountered by the actuator nut.

While the invention has been described with reference to a specific embodiment, it will be obvious to those skilled in the art that variations and modifications can be constructed without departing from the scope of the invention as defined by the following claims.

What is claimed is:

1. A disc brake actuator comprising a housing having a bore therethrough, torque applying means, a power screw having a first end connected for rotation by said torque applying means, a second end having external threads and a radially extending flange intermediate said first and second ends for axially fixing the power screw, an actuator nut having internal threads engaging said external threads on said power screw and a plurality of axially extending splines on an external surface thereof, a plurality of axially extending splines internally of said bore and engaging said external splines of said actuator nut to prevent said nut from rotating relative to said housing, a piston movable in a brake applying direction in said bore by said actuator nut, an aperture at one end of said piston, said second end of said shaft extending through said aperture to the interior of said piston, a bushing supporting said second end of said shaft internally of said piston, means fixing said bushing against axial movememt toward said second end of said shaft, and a spring seated at one end against said bushing and at the other end against said piston, whereby rotation of said power screw in one direction translates said actuator nut and said piston in a brake applying direction and said spring biases said piston and said actuator nut axially away from said bushing to a rest position when torque is not applied to said power screw.

2. A disc brake actuating apparatus comprising: a housing having a bore therethrough, torque applying means, a power screw having a medial radially extending flange for axially fixing the screw, a first end having splines for connection to said torque applying means and a second end with external threads, actuator means having internal threads engaging the external threads on said power screw, a cap fixed to said housing and having a bore concentric with said housing bore and a radially extending thrust surface axially fixing said medial flange of said power screw, said cap having a splined connection with and preventing rotation of said actuator means, hollow piston means apertured at one end and movable in a brake applying direction in said housing bore by said actuator means in response to turning of said power screw in one direction, said second end of said shaft extending through said aperture to the interior of said piston means, a first bushing carried by said cap and mounting said first end of said shaft for rotation, a second bushing located within said hollow piston means and supporting said second end of said shaft for rotation within said hollow piston means, means fixing said second bushing against axial movement toward said second end of said shaft, and a spring seated at one end against said bushing and at the other end against said piston means, said spring biasing said piston means to a rest position when torque is no longer applied to turn said power screw means.

* * * * *